Patented Aug. 4, 1936

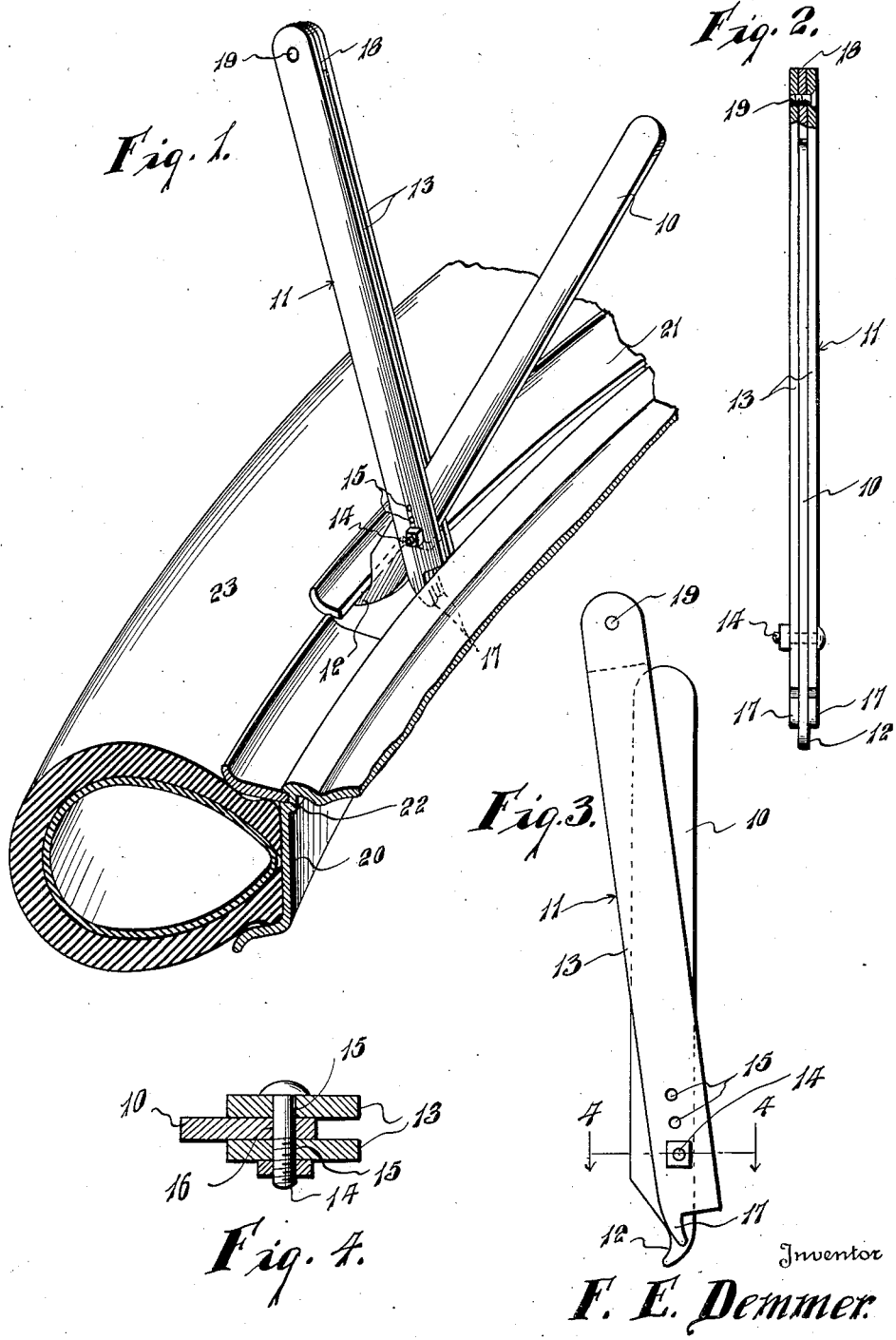

2,050,167

UNITED STATES PATENT OFFICE 2,050,167

RIM TOOL

Frank E. Demmer, Keeline, Wyo.

Application May 29, 1935, Serial No. 24,107

1 Claim. (Cl. 157—6)

This invention relates to a rim tool adapted to effect easy and expeditious removal of split rings as used on some wheel rims to secure pneumatic tires in place.

It is particularly aimed to provide a construction which is exceedingly simple, inexpensive and operable with minimum leverage.

The more specific objects and advantages will become apparent from a consideration of the description following taken in connection with accompanying drawing illustrating an operative embodiment.

In said drawing:—

Figure 1 is a perspective view showing the tool in use, initiating the removal of a split ring;

Figure 2 is an edge elevation of the tool;

Figure 3 is a side elevation of the tool; and

Figure 4 is a cross sectional view taken on the line 4—4 of Figure 3.

Referring specifically to the drawing, wherein like reference characters designate like or similar parts, the tool consists of two lever sections 10 and 11. Said section 10 is a single bar or iron formed into a hook or projection 12 at one end thereof.

The other section 11 consists of a pair of bars or irons 13 disposed in spaced relation and pivoted to the bar 10 by means of a bolt 14 or the like. Said bolt 14 is preferably removable and is selectively passed through a series of openings 15 in the bars 13 and an opening 16 in the bar 10, the latter opening being eccentric or closer to one side or longitudinal edge of the bar 10 than to the other.

Said bars 13 have hooks or projections 17 at the ends thereof adjacent the hook 12 and it will be noted that the hooks curve slightly in the opposite direction to the hooks 12. Adjacent the upper end of the section 11, the bars 13 are maintained in spaced relation, so that bar 10 may enter between the same, by means of a spacer element 18 and a bolt 19 passed removably through the element 18 and bars 13.

The tool is adapted to be used in connection with an automobile or vehicle wheel whose felly 20 has a removable, contractile split ring 21 disposed in a circumferential groove 22 of the felly to secure a pneumatic tire 23 in place. In using the tool, the same is held substantially in the position of Figure 3, with one hand engaging section 10 and the other hand engaging section 13.

As hook 12 is longer than the hooks 17, it is entered into the groove 22 initially prying one end of the split ring 21 outwardly, after which the tool sufficiently descends for the hooks 17 to also enter and engage the felly as shown in Figure 1, whereupon the levers at the upper ends are pulled apart completely moving the split ring 21 from the felly, or to a position where it may be readily grasped and removed by hand.

The device is also used for replacing the split ring 21 in groove 22 by reversing the positions of the lever sections 10 and 11 so that the bills of the hooks 12 and 17 are presented toward one another. When so positioned the hook 12 is engaged with the felly of the wheel interiorly of the groove 22 and the hook 17 with the upper edge of the ring when by squeezing the levers toward each other the ring will seat in the groove, this operation being repeated circumferentially of the wheel until the ring is completely seated. For this operation it may be necessary to adjust the bolt 14 to permit additional movement of the hooks relatively to one another.

It will also be realized that the tool is effective on the dual tire type of wheels, being useful to remove the ring 21 for the outer tire or such ring for the inner tire after the outer tire has been removed.

While the device has been shown and described as used for removing split rings of one type, it will be apparent that it may be used with other types of split rings and also endless rings used in some types of wheels.

Various changes may be resorted to provided they fall within the spirit and scope of the invention.

What is claimed is:—

A rim tool of the class described comprising a lever having a hook at one end thereof, a second lever, said second lever consisting of bars on opposite sides of the first lever and provided with hooks at the same end as the first lever and deflected in the opposite direction, means spacing said bars at a point from the fulcrum and the first lever being disposable between said bars, said means comprising a spacing element, and a fastening passing through the bars and element, and the first mentioned hook being longer than the other hook.

FRANK E. DEMMER.